United States Patent
Horishita et al.

(10) Patent No.: US 10,317,527 B2
(45) Date of Patent: Jun. 11, 2019

(54) APPARATUS THAT DETECTS PERSON BY USING SONIC SENSOR, METHOD, ELECTRONIC APPARATUS THAT INCLUDES THE DETECTION APPARATUS, AND STORAGE MEDIUM

(71) Applicant: CANON KABUSHIKI KAISHA, Tokyo (JP)

(72) Inventors: Yusuke Horishita, Nagareyama (JP); Michio Fukushima, Yokohama (JP); Junnosuke Yokoyama, Toride (JP); Manabu Hada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/142,741

(22) Filed: Sep. 26, 2018

(65) Prior Publication Data
US 2019/0025424 A1    Jan. 24, 2019

Related U.S. Application Data

(62) Division of application No. 15/642,678, filed on Jul. 6, 2017, now Pat. No. 10,120,071.

(30) Foreign Application Priority Data

Jul. 29, 2016   (JP) .................................. 2016-150367

(51) Int. Cl.
*G01S 15/04* (2006.01)
*G01S 15/08* (2006.01)
*G01S 15/88* (2006.01)
*H04N 1/00* (2006.01)

(52) U.S. Cl.
CPC .............. *G01S 15/04* (2013.01); *G01S 15/08* (2013.01); *G01S 15/88* (2013.01); *H04N 1/00896* (2013.01); *H04N 1/00912* (2013.01); *H04N 2201/0094* (2013.01)

(58) Field of Classification Search
CPC .......................... A61B 5/0048; G06K 9/00335
USPC ........................................................ 367/93
See application file for complete search history.

(56) References Cited

U.S. PATENT DOCUMENTS

| 9,345,133 B2 | 5/2016 | Yokoyama | |
| 2011/0125019 A1* | 5/2011 | Shiina .................. | A61B 5/0048 600/443 |
| 2011/0144500 A1* | 6/2011 | Nihei ....................... | A61B 8/14 600/443 |

(Continued)

FOREIGN PATENT DOCUMENTS

JP    2015-195548    11/2015

*Primary Examiner* — Fabricio R Murillo Garcia
(74) *Attorney, Agent, or Firm* — Venable LLP

(57) ABSTRACT

An information processing apparatus including: a sonic sensor that outputs a sonic wave and receives a reflected wave of the output sonic wave; and a control unit configured to determine whether a person exists on a periphery of the information processing apparatus based on distance data and background data, wherein the distance data indicates intensity of a reflected wave in fixed time units received by the sonic sensor during a predetermined period of time after a sonic wave is output from the sonic sensor, the fixed time units being obtained by dividing the predetermined period of time, and the background data is past distance data prepared in advance.

22 Claims, 12 Drawing Sheets

(56) References Cited

U.S. PATENT DOCUMENTS

2014/0318850 A1* 10/2014 Yokoyama ............. H05K 1/111
  174/268
2015/0261168 A1* 9/2015 Yokoyama ............. G03G 15/80
  399/81
2018/0034995 A1 2/2018 Yokoyama

* cited by examiner

APPARATUS THAT DETECTS PERSON BY USING SONIC SENSOR, METHOD, ELECTRONIC APPARATUS THAT INCLUDES THE DETECTION APPARATUS, AND STORAGE MEDIUM

This application is a divisional of U.S. application Ser. No. 15/642,678, filed on Jul. 6, 2017, which claims priority to Japan 2016-150367, filed on Jul. 29, 2016, the contents of each of which is hereby incorporated by reference.

BACKGROUND OF THE INVENTION

Field of the Invention

The present invention relates to a technique to prevent erroneous detection due to a stationary object in human body detection using a range sensor, such as an ultrasonic sensor.

Description of the Related Art

In recent years, in many electronic apparatuses, such as a printer, a human sensor function to determine whether a person is a user or a passerby by measuring the distance from the electronic apparatus to the human body is mounted. As a sensor to implement this human sensor function, for example, an ultrasonic sensor is used (see Japanese Patent Laid-Open No. 2015-195548).

The ultrasonic sensor is a sensor that detects an object by radiating an ultrasonic wave and receiving a reflected wave that returns. By measuring the elapsed time between the ultrasonic wave being output and the reflected wave from the object being received, the distance to the object is calculated. However, the ultrasonic wave that is radiated from the ultrasonic sensor is also reflected by an object other than the human body, which exists on the periphery of the human body. Consequently, unless some measure is taken, there is a possibility that, for example, it is erroneously determined that a user still remains there by the reflected wave from a stationary object, such as a pillar on its periphery and temporarily placed baggage, despite that the user has already left an electronic apparatus, such as a printer. Because of this, it is important to make it possible to distinguish the received reflected wave from a stationary object from that from a human body. Then, the problem of erroneous determination due to a stationary object is a problem common to the all kinds of range sensor.

An object of the present invention is to accurately detect a person who is approaching (or a person who is leaving) an electronic apparatus, such as a printer, by preventing erroneous detection due to a stationary object in human body detection using a range sensor.

SUMMARY OF THE INVENTION

The information processing apparatus according to the present invention is an information processing apparatus including: a sonic sensor that outputs a sonic wave and receives a reflected wave of the output sonic wave; and a control unit configured to determine whether a person exists on a periphery of the information processing apparatus based on distance data and background data, wherein the distance data indicates intensity of a reflected wave in fixed time units received by the sonic sensor during a predetermined period of time after a sonic wave is output from the sonic sensor, the fixed time units being obtained by dividing the predetermined period of time, and the background data is past distance data prepared in advance.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

[First Embodiment]

Figure 1:
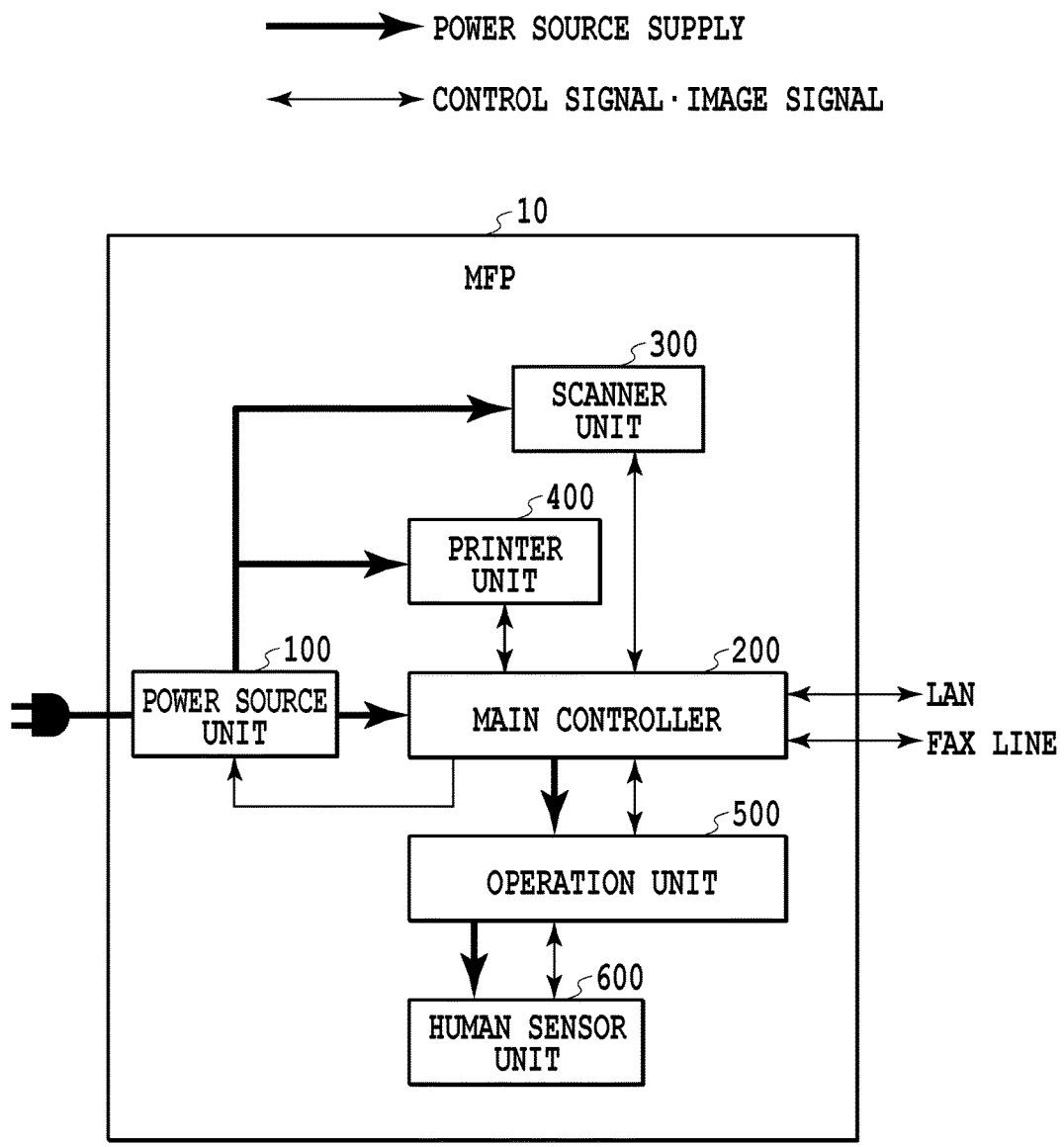
FIG. 1 is an outline block diagram of an MFP.

FIG. 1 is an outline block diagram of a multi function printer (MFP) as an electronic apparatus that mounts a human sensor function according to the present embodiment. An MFP 10 includes a plurality of functions, such as a print function, a scanner function, a copy function, and a FAX function.

The MFP 10 includes a power source unit 100, a main controller 200, a scanner unit 300, a printer unit 400, an operation unit 500, and a human sensor unit 600. The MFP 10 has at least two modes as a power mode, specifically, a standby mode that is a state where the normal operation of the MFP 100, such as the copy operation and the scan operation, can be performed and a sleep mode in which power consumption is suppressed more than that in the standby mode. For example, in the case where the MFP 10 is not used by a user for a predetermined period of time, the main controller 200 shifts the above-described power mode from the standby mode into the sleep mode by controlling the power source unit 100. In the sleep mode, the power source supply to the scanner unit 300, the printer unit 400, and so on, is suspended and to the main controller 200 and the operation unit 500 also, the power source supply is suspended except for part thereof. In the sleep mode also, the human sensor unit 600 is maintained in the operable state, and detects whether a user of the MFP 10 is within a predetermined range and performs control to resume the standby mode from the sleep mode.

Figure 2:
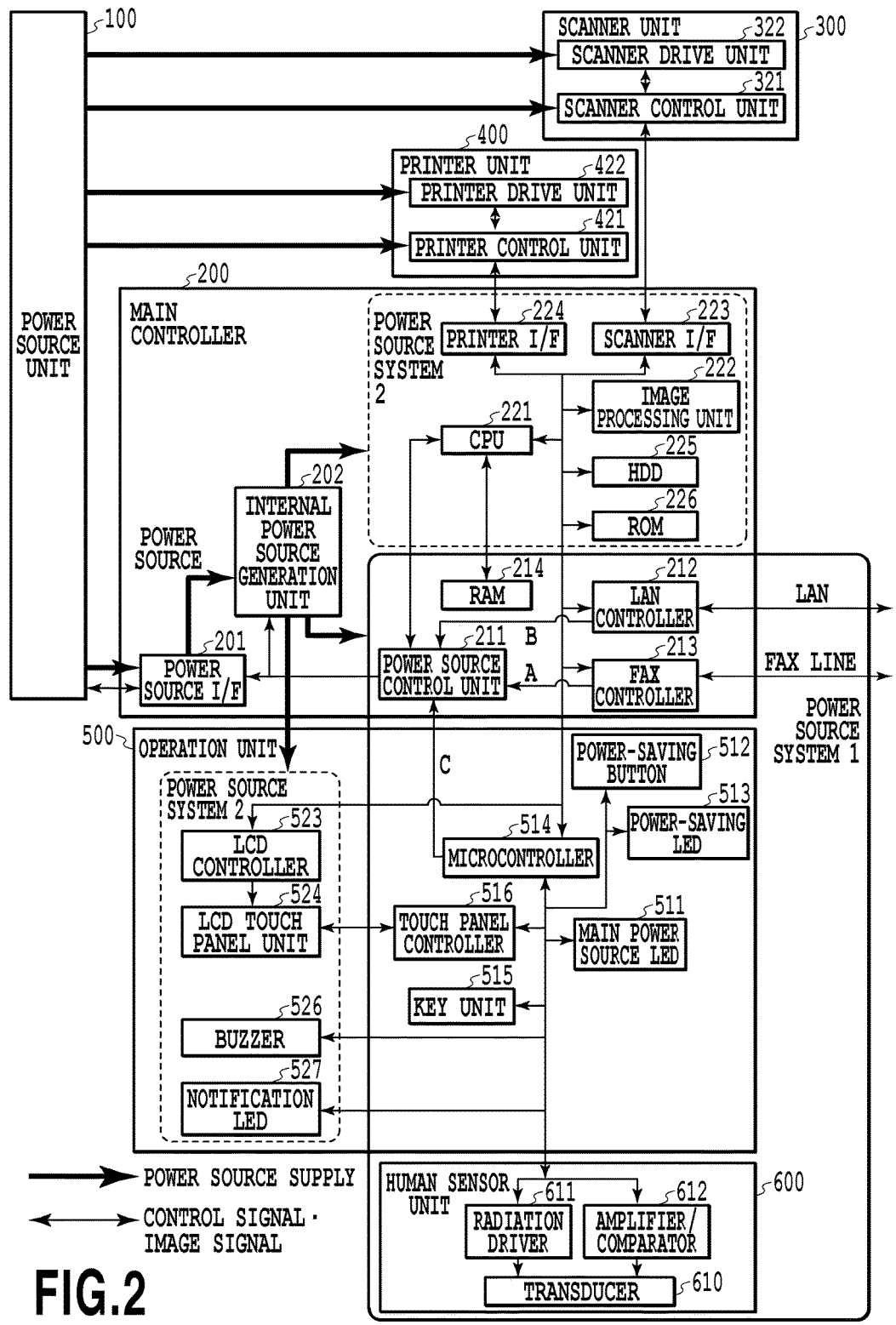
FIG. 2 is a block diagram showing details of each unit of the MFP.

FIG. 2 is a block diagram showing details of each unit (power source unit 100, main controller 200, scanner unit 300, printer unit 400, operation unit 500, human sensor unit 600) described above included in the MFP 10.

The scanner unit 300 generates image data by optically reading a document set on an ADF (Auto Document Feeder) or the like, not shown schematically. The scanner unit 300 includes a scanner control unit 321 and a scanner drive unit 322. The scanner drive unit 322 includes a drive mechanism to move a read head to read a document, a drive mechanism to convey a document to a reading position, and so on. The scanner control unit 321 receives setting information relating to scanner processing set by a user from the main controller 200 and controls the operation of the scanner drive unit 322 based on the setting information.

The printer unit 400 forms an image on a printing medium (sheet) in accordance with, for example, an electrophotographic scheme. The printer unit 400 includes a printer control unit 421 and a printer drive unit 422. The printer drive unit 422 includes a motor to rotate a photoconductor drum, a mechanism unit configured to apply pressure to a fixing unit, a heater, and so on. The printer control unit 421 receives setting information relating to printing processing set by a user from the main controller 200 and controls the operation of the printer drive unit 422 based on the setting information.

The main controller 200 has a function to centralizedly control the MFP 10 and includes configurations (CPU, ROM, RAM, and so on) therefor. The main controller 200 performs various operations, for example, performing necessary image processing for image data input from a FAX line and outputting the image data, and copying, scanning, printing, and so on, in accordance with user instructions given to the operation unit 500. Further, the main controller 200 also switches the above-described power modes by controlling the power source unit 100.

The inside of the main controller 200 is divided into at least two kinds of system: a power source system 1 that needs to be maintained in the operable state also in the sleep mode and a power source system 2 that does not need to be maintained in the operable state in the sleep mode. By an internal power source generation unit 202 that receives power source supply from a power source I/F 201, power is supplied to the power source system 1 at all times. To the power source system 1, a power source control unit 211, a FAX controller 213, and a LAN controller 213 are connected so that it is possible to react in the case of FAX reception or in the case where a request for printing is made via a network even in the sleep mode. On the other hand, to the power source system 2, a scanner I/F 223, a printer I/F 224, and an HDD 225 are connected, in addition to a ROM 226 that stores programs and the like that are necessary at the time of activation and an image processing unit 222 configured to perform image processing necessary at the time of the operation, such as copying. To each unit connected to the power source system 2, power is not supplied in the sleep mode. In the case where one of interrupt signals A to C is input from the connection destination in the sleep mode, the power source control unit 211 supplies power to the power source system 2 by controlling the internal power source generation unit 202 and shifts the sleep mode into the standby mode.

Here, the interrupt signal A is a signal that is output in response to the FAX controller 213 receiving a FAX from the FAX line. The interrupt signal B is a signal that is output in response to the LAN controller 212 receiving a print job packet or a state check packet from the LAN. The interrupt signal C is a signal that is output from a microcontroller 514 inside the operation unit 500 and is also a signal that is output in the case where the human sensor unit 600 detects a user or at the time of a power-saving button 512 being pressed down. In the case where power supply to the power source system 2 within the main controller 200 is started by these interrupt signals A to C, a CPU 221 reads state information to cause the MFP 10 to resume the state before the shift into the sleep mode from a RAM 214 having been performing a self-refresh operation at all times. After this, in the case where the normal power mode is resumed, processing in accordance with the cause of resumption of the interrupt signals A to C is performed by the CPU 221.

The operation unit 500 includes an LCD touch panel unit 524 in which an LCD panel and a touch panel are integrated into one unit, a key unit 515 configured to detect an operation of a key, such as a ten-key and a start key, by a user, and a buzzer 526. On the LCD touch panel unit 524, image data on a UI screen generated by the main controller 200 is drawn by an LCD controller 523. By a user operating the UI screen displayed on the LCD touch panel unit 524 by touching it, a touch panel controller 516 analyzes data of coordinates of the portion touched by the user and notifies the microcontroller 514 of the analysis results and the microcontroller 514 further notifies the CPU 211 of the analysis results. The microcontroller 514 periodically checks the presence/absence of the user operation to the key unit 515 and notifies the CPU 221 of the user operation in the case where the user operation is checked. The CPU 221 notified of the user operation to the LCD touch panel unit 524 and the key unit 515 causes the MFP 10 to operate in accordance with the operation contents.

In the operation unit 500, a plurality of kinds of LED is incorporated, such as a notification LED 527, a main power source LED 511, and a power-saving LED 513. The main power source LED 511 is an LED that remains in the turned-on state at all times while the main power source of the MFP 10 is in the turned-on state. The notification LED 527 is an LED that is controlled by the microcontroller 514 and which notifies a user of the state of the MFP 10, such as a job-executing state and a state where an error has occurred. The inside of the operation unit 500 is also divided into at least two kinds of system: the power source system 1 that needs to be maintained in the operable state also in the sleep mode and the power source system 2 that does not need to be maintained in the operable state in the sleep mode. To the power source system 1, the microcontroller 514, the main power source LED 511, the power-saving button 512, the power-saving LED 513, the touch panel controller 516, and the key unit 515 are connected and power is supplied also in the sleep mode. To the power source system. 2, the LCD controller 523, the LCD touch panel unit 524, the buzzer 526, and the notification LED 527 are connected and power supply is suspended in the sleep mode.

The human sensor unit 600, which is a range sensor, is connected to the power source system 1 to which power is supplied also in the sleep mode. By the microcontroller 514 periodically reading the state of the human sensor unit 600 and performing processing, it is possible to detect the movement of a person even in the sleep mode. The human sensor unit 600 includes a transducer 610, a radiation driver 611, and an amplifier/comparator 612. The microcontroller 514 drives the transducer 610 via the radiation driver 611. The transducer 610 converts an electric signal given by the radiation driver 611 into vibrations and radiates an ultrasonic wave toward the front of the MFP 10. Further, the transducer 610 receives a reflected wave from an object and converts the reflected wave into an electric signal. The amplifier/comparator 612 amplifies a small electric signal that is output from the transducer 610 by an amplifier or the like, performs envelope detection at a predetermined frequency, performs binarization by a comparator, and converts the electric signal into a signal that the microcontroller 514 can process. It is possible for the microcontroller 514 to perform interrupt reception of an output signal from the amplifier/comparator 612. The transducer 610 in the present embodiment performs both transmission and reception, but for example, a configuration in which a transducer for transmission (radiation) and a transducer for reception are connected to the radiation driver 611 and the amplifier/comparator 612, respectively, may be accepted. The sensor that is used in the human sensor unit 600 may be any sensor as long as it is capable of measuring the distance to a human body existing in a predetermined range, and for example, a photoelectric sensor that makes use of infrared rays may be accepted.

The microcontroller 514 is a compact control computer that incorporates a CPU, a memory, a timer, and so on, in one chip. The microcontroller 514 inputs an ultrasonic oscillation output signal to the human sensor unit 600 and then determines the existence of a human body (user) by processing detection results of a reflected wave input to the human sensor unit 600. Then, in the case of determining that a user exists, the microcontroller 514 outputs the interrupt signal C to the power source control unit 211. These pieces of processing are implemented by the internal CPU of the microcontroller 514 reading and executing control programs stored in the internal ROM. Upon receipt of the interrupt signal C, the power source control unit 211 causes the MFP 10 to resume the standby mode from the sleep mode by controlling the power source unit 100. It may also be possible to directly supply a power source to the human sensor unit 600 from the power source unit 100. Further, in the present embodiment, the microcontroller 514 is incorporated in the operation unit 500 and integrated with the MFP 10 into one unit, but it may also be possible to configure a mechanism that performs user detection control, to be explained below, as an apparatus independent of the MFP 10.

Figure 3A:
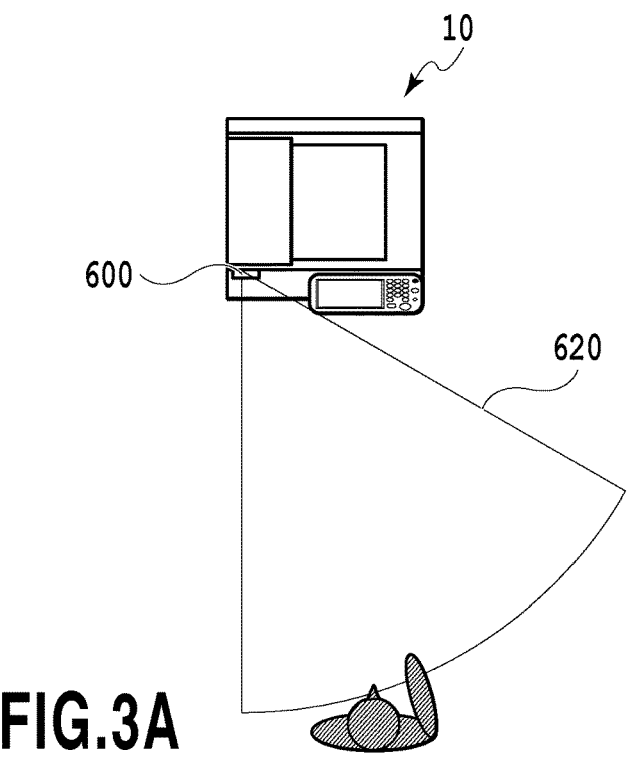
FIG. 3A and FIG. 3B are each a diagram showing a detection area of a human sensor unit.
Figure 3B:
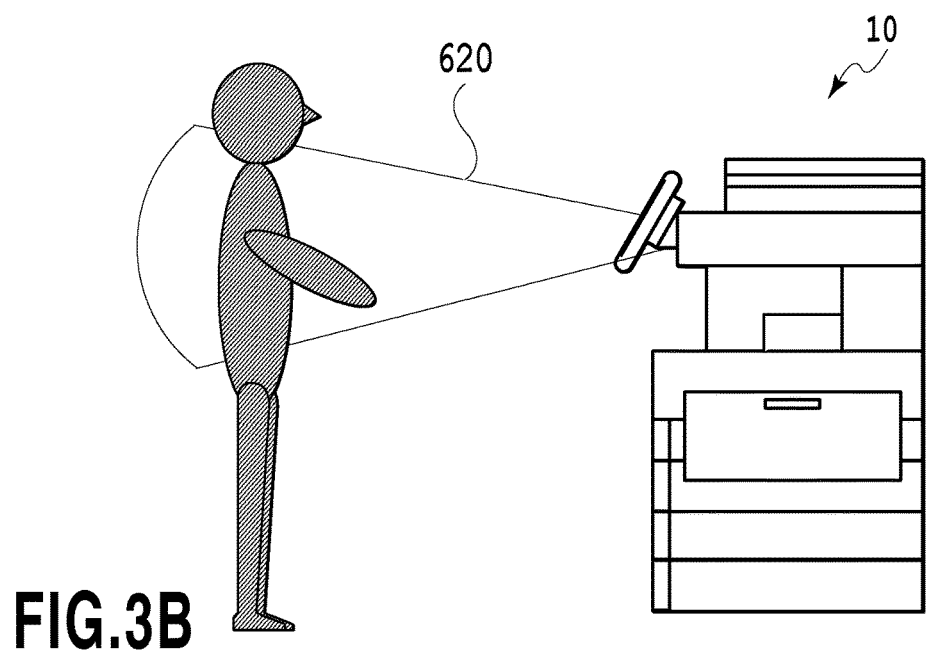

FIG. 3A and FIG. 3B are each a diagram showing a detection area of the human sensor unit 600. The human sensor unit 600 radiates an ultrasonic wave at a predetermined frequency (e.g., 400 kHz) and receives a reflected wave that hits an object and returns, and estimates the distance to the object based on the time elapsed between the radiation and the reception. FIG. 3A is a diagram in the case where the MFP 10 is viewed from the above and FIG. 3B is a diagram in the case where the MFP 10 is viewed from the side and a sectoral portion 620 indicates a detection area. In the present embodiment, the detection area of the human sensor unit 600 is set in front of the MFP 10 (or in front of the MFP 10 in somewhat downward direction), and thereby, the ultrasonic wave that hits and is reflected from the human body is detected. Then, it is assumed that the detection area 620 is set so that detection is possible in two stages, i.e., a first stage in which a person existing at a distance shorter than that of a position about 2 m apart from the casing of the MFP 10 is detected and a second stage in which a person existing within an area in front of the casing about 50 cm distant therefrom and whose width is the same as the casing width is detected.

Figure 4:
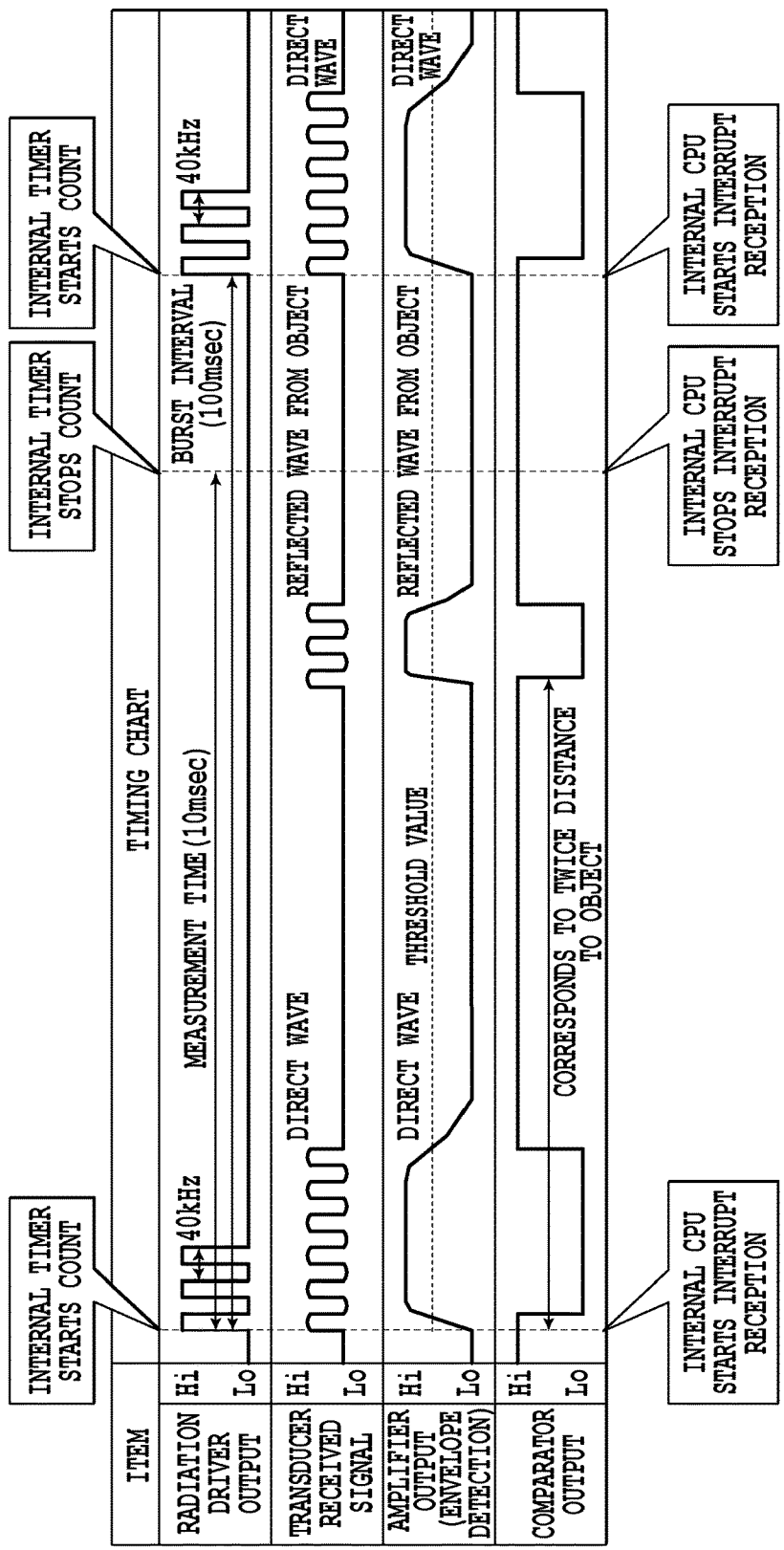
FIG. 4 is a diagram showing input/output timing of each signal in the human sensor unit.

FIG. 4 is a diagram showing input/output timing of each signal in the human sensor unit 600. First, the microcontroller 514 drives the radiation driver 611 and at the same time, causes the internal timer to start to count. Further, the microcontroller 514 starts interrupt reception from the amplifier/comparator 612. The radiation driver 611 drives the transducer 610 at a frequency unique to the sensor (here, 40 kHz). In the present embodiment, the transducer 610 is driven in a duty ratio of 50%, but the duty ratio does not necessarily need to be 50%. For example, it may also be possible to increase the duty ratio stepwise from 5%, 10%, . . . , and so on, from the start of the drive of the transducer 610. Due to this, it is possible to make low the audible sound produced by the transducer 610. Here, the transducer 610 receives a detection signal of an ultrasonic wave substantially at the same time as the burst drive (burst interval: 100 msec) of the radiation driver 611, and this signal is a detection signal of a "direct wave" in which the ultrasonic wave radiated from the transducer 610 and reverberating vibrations of the transducer 610 overlap. Consequently, the portion obtained by removing the detection signal of the direct wave from the received detection signal is the detection signal of the "reflected wave" that is reflected from an object and returns.

The microcontroller 514 continues to perform interrupt reception of an output signal from the amplifier/comparator 612 during a predetermined measurement time (here, 10 msec) from the drive start time of the radiation driver 611. It is possible for the microcontroller 514 to obtain the distance to an object by measuring the time taken until the interrupt reception of the output signal by the reflected wave. Specifically, the time taken until the interrupt reception is obtained by dividing the distance twice the distance to an object by the sound speed (about 340 m/sec at to =25° C.), and therefore, it is possible to obtain the distance to an object by this relational expression. The above-described measurement time 10 msec is based on the premise that a person who enters a range about 1.7 m from the MFP is recognized and in the case where it is desired to be able to recognize a person at the point in time at which the person enters a range more distant, it is sufficient to increase the measurement time.

<User Detection Processing>

Figure 5:
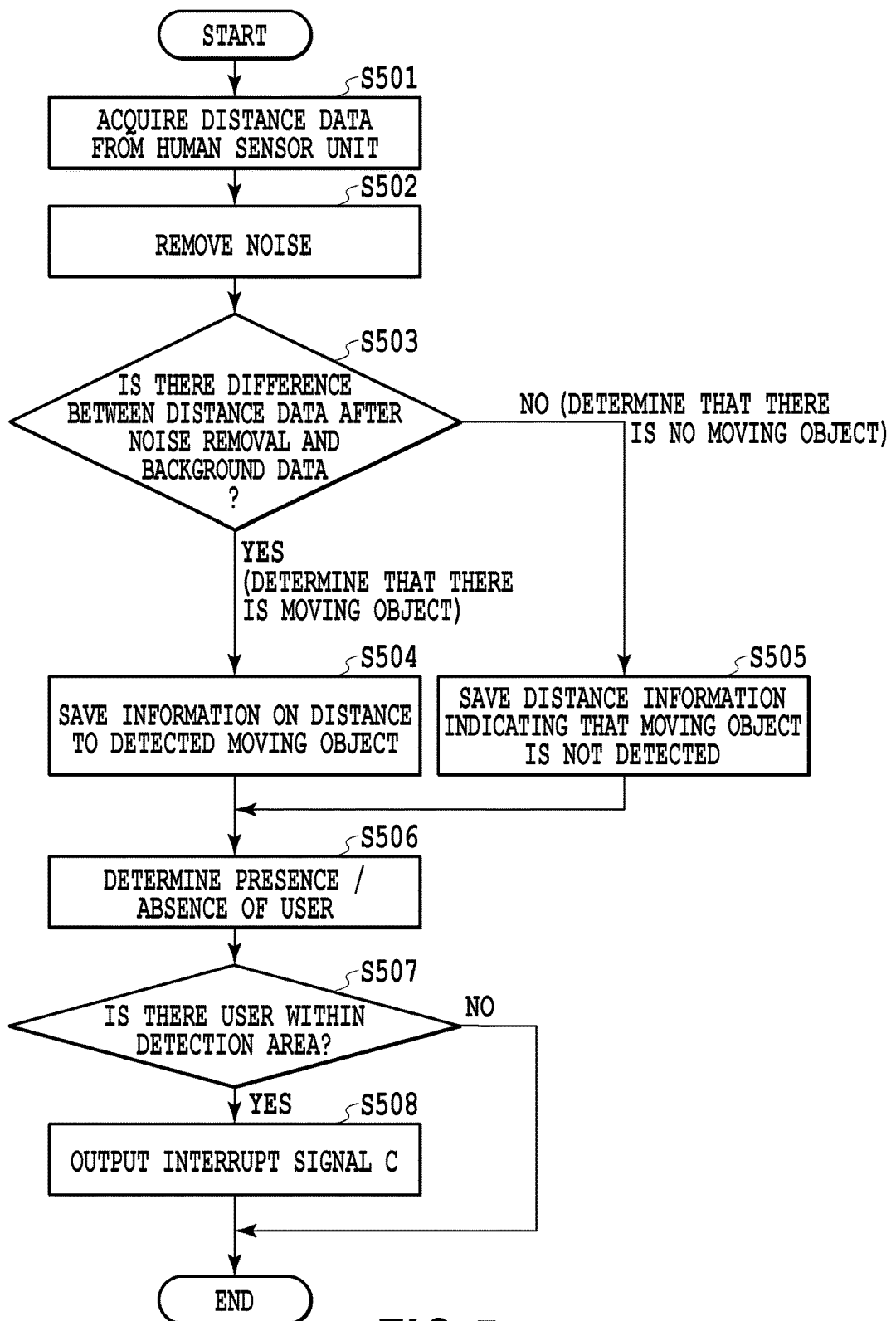
FIG. 5 is a flowchart showing a flow of user detection processing according to a first embodiment.

FIG. 5 is a flowchart showing a flow of user detection processing in the sleep mode, which is performed by the microcontroller 514 of the MFP 10. The microcontroller 514 performs the user detection processing shown in the flow in FIG. 5 at predetermined time (e.g., 100 msec) intervals. It should be noted that in this flow, necessary processing is described by focusing attention only on the control to suppress erroneous detection due to a stationary object, which is an object of the present invention.

Figure 6:
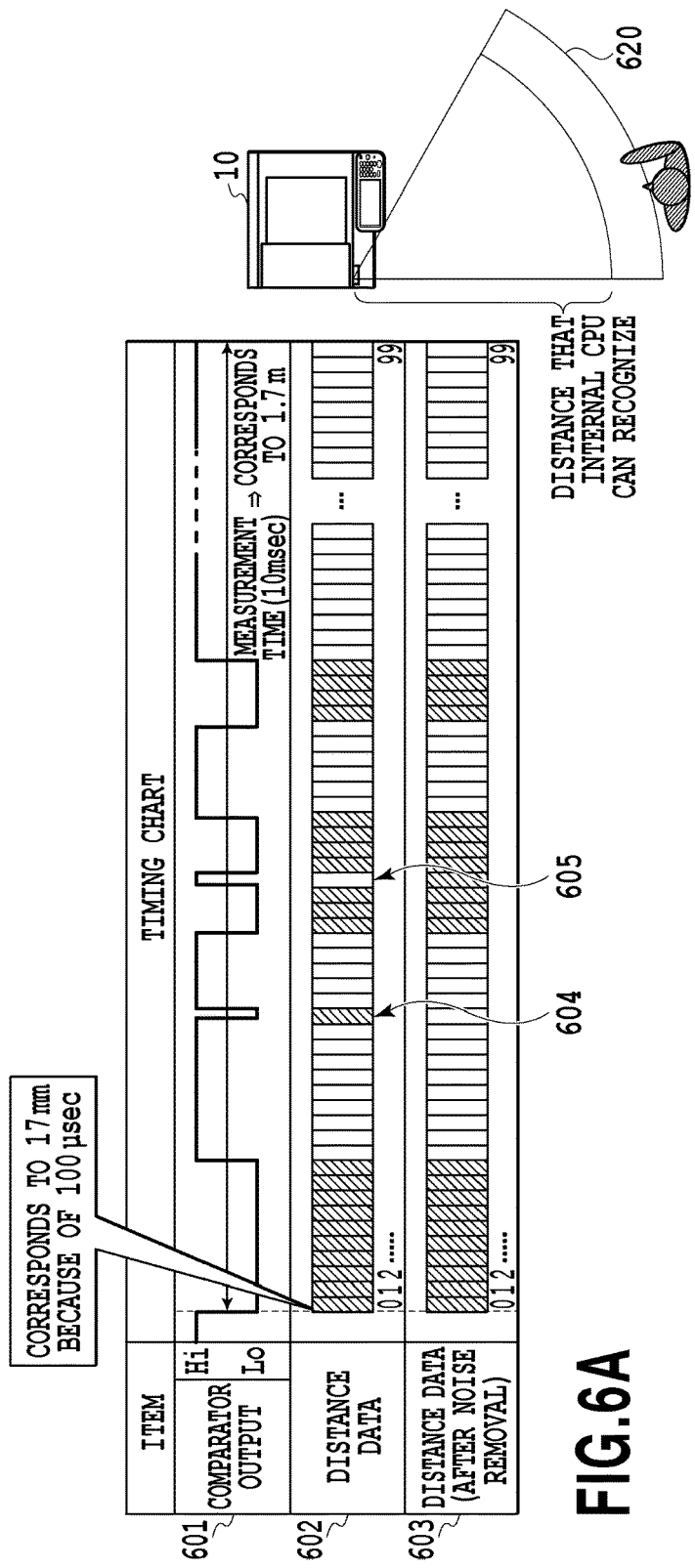
FIG. 6A is a diagram showing an example of distance data and FIG. 6B is a diagram showing a detection area.

At step 501, instructions to radiate ultrasonic waves and to measure the reflected waves thereof are given to the human sensor unit 600 and an output signal (digital signal) of the amplifier/comparator 612, which is measurement results, is acquired. Specifically, timing at which the output signal changes from High to Low (Fall) and timing at which the output signal changes from Low to High (Rise) are acquired by interrupt reception. The state of the output signal of the amplifier/comparator 612 thus acquired is saved in the internal memory of the microcontroller 514 as distance data indicating the distance to an object that exists within the detection area 620. FIG. 6A is a diagram showing an example of distance data that is saved in the internal memory and 601 indicates the output signal of the amplifier/comparator 612 and 602 indicates the distance data. In the distance data 602, the shaded portion indicates "there is an object" corresponding to Low of the output signal and the non-shaded portion indicates "there is no object" corresponding to High of the output signal. The microcontroller 514 of the present embodiment secures an area to save distance data corresponding to a measurement time of 10 msec in the internal memory. Here, it is assumed that the sound speed=340 m/sec and in the case where 10 msec is converted into a distance, then, 340 (m/sec)×10 (msec)/2=1.7 m. In this case, it is made possible for the microcontroller 514 to recognize the existence/nonexistence of an object up to 1.7 m in front of the MFP 10 (see FIG. 6B). Here, the distance data has an array structure in which 100 elements in total, which are obtained by dividing the measurement time 10 msec into 100 units, are arranged in time series. At this time, one element corresponding to the unit distance indicates 17 mm (10 msec/100=100 μsec). In the case where it is desired to perform sampling of shorter distances, it is sufficient to increase the number of divisions per measurement time (to make units of division smaller)

At step 502, for the acquired distance data, noise removal processing is performed. Various kinds of noise, such as high-frequency sound due to, for example, spray injection and the like, may get mixed in the transducer 610, and therefore, in the digital signal to be received by the microcontroller 514, the noise may be included. Consequently, at this step, the noise included in the distance data acquired at step 501 is removed. For example, in the case where the interval of the Fall interrupt and the Rise interrupt of the digital signal to be received from the amplifier/comparator 612 is too narrow, or on the contrary, too wide, this is determined to be noise and removed from the distance data. As the determination criterion of noise, it is sufficient to set threshold values so that, for example, the number of elements described previously in the reflected wave from a human body less than or equal to three is determined to be too narrow and the number larger than or equal to twenty is determined to be too wide in the case where the number is about ten to fifteen in an experiment or the like. Then, it is sufficient to remove the portion determined to be noise by applying opening (expansion processing)/closing (contraction processing) and the like, which a common filtering method in binary image processing. In the distance data 602 shown in FIG. 6A, reference symbol 604 indicates the portion where it is estimated that an object that should not exist is detected and reference symbol 605 indicates the portion where it is estimated that an object that should exist cannot be detected and both portions are determined to be noise. Distance data 603 shown in FIG. 6A is obtained by removing these portions 604 and 605 determined to be noise from the distance data 602. The distance data after removal of noise is saved again in the internal memory as the distance data of the current frame. In the case where the possibility that noise is included in the output signal of the human sensor unit 600 is slight, this step may be omitted.

Figure 7:
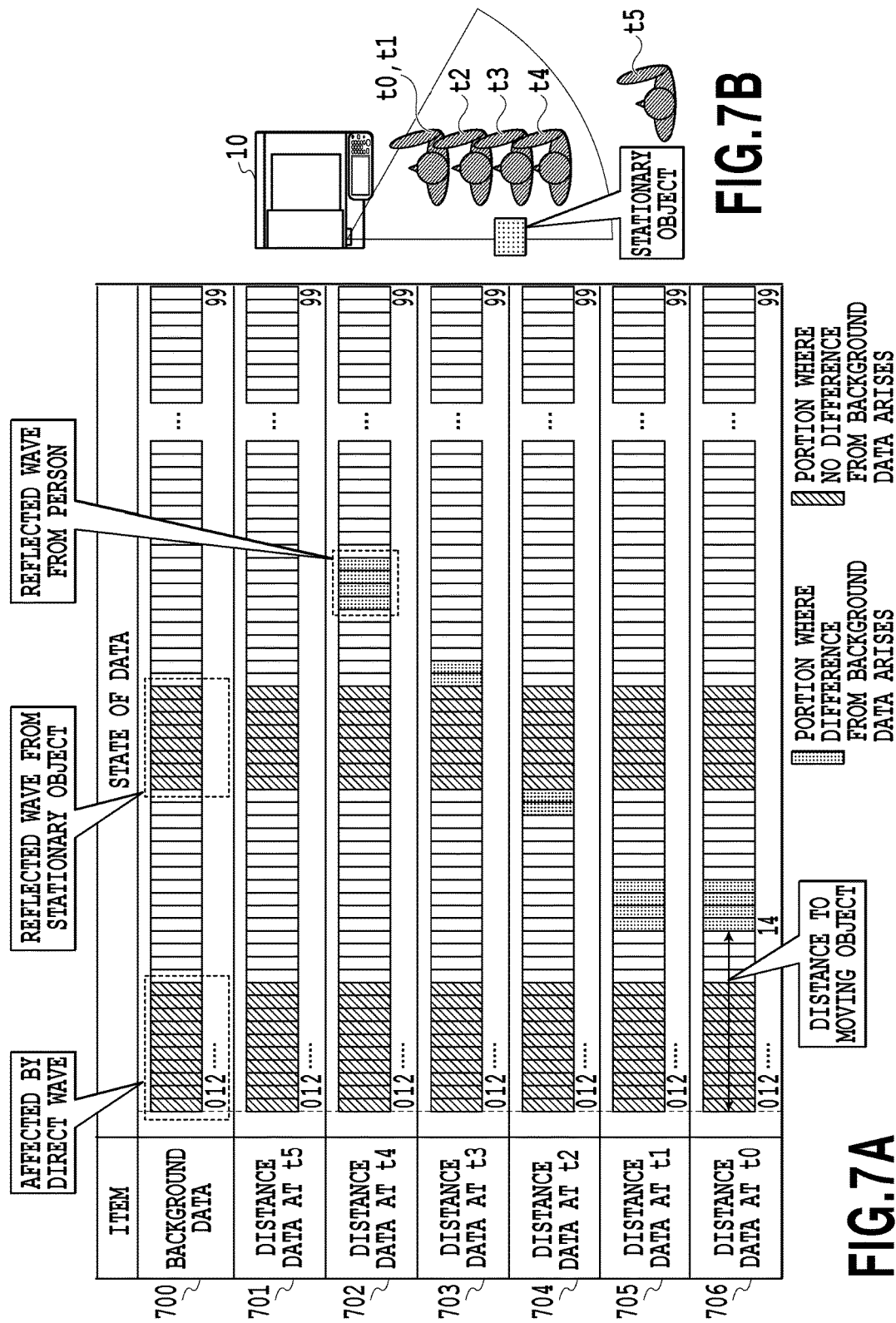
FIG. 7A is a diagram showing a relationship between distance data and background data and FIG. 7B is a diagram showing a position relationship of a person.

At step 503, the above-described distance data of the current frame and the background data acquired and saved in advance are read from the internal memory and whether there is a difference therebetween is determined. Here, the background data is the distance data that indicates the position of a stationary object existing within the detection area 620. This background data is generated by using the human sensor unit 600 and includes information of the reflected wave originating from a stationary object (e.g., pillar, temporarily placed baggage, and so on) existing within the detection area 620, in addition to information on the direct wave. Acquisition of this background data will be described later. FIG. 7A is a diagram showing a relationship between distance data and background data at a plurality of points in time and FIG. 7B is a diagram showing a position relationship of a person who approaches the MFP 10 at a plurality of points in time. First, at a point in time t5, the person is outside the range of the detection area 620. Because of this, distance data 701 obtained at the point in time t5 is equal to background data 700 and there is no difference between both pieces of data. In contrast to this, at each of points in time t4 to t0, the person exists within the detection area 620 and the person approaches the MFP 10 stepwise from t4 to t0. Because of this, at each of the points in time t4 to t0, a difference arises between the background data 700 and each of distance data 702 to 706. In the case where the results of the comparison between both pieces of data indicate that there is a difference, it is determined that a moving object (human body) exists within the detection area 620 and the processing advances to step 504. On the other hand, in the case where there is no difference, it is determined that a moving object (human body) does not exist within the detection area 620 and the processing advances to step 505.

At step 504, information (distance information) indicating the distance to the moving object (human body) determined to exist at step 503 is saved in the internal memory. For example, in FIG. 7A described previously, the distance to the moving object at the point in time t0 is a value obtained by multiplying 17 mm, which is the distance corresponding to one element, by 14, which is the number of elements to the moving object, i.e., 17×14=238 mm. Consequently, the information, i.e., 238 mm is saved in the internal memory as the distance information at the point in time t0. As described previously, the distance to the detected object is equivalent to the time taken between the ultrasonic wave being radiated and the ultrasonic wave being reflected from the human body and returning, and therefore, the time information before being converted into a distance may be saved as distance information. In this manner, in the internal memory, the distance information corresponding to a past predetermined period of time (e.g., past twenty frames: 20×100 msec=2.0 sec) dated back from the current frame by a predetermined number of frames is saved in time series. The microcontroller 514 determines whether there is a user expected to have the intention of using the MFP 10 within the detection area 620 by analyzing the distance information saved in time series (step 506, to be described later). The number of frames to be saved may be arbitrary and the larger the number of frames to be saved, the more detailedly, it is made possible to know the past state of the detection area 620, but it becomes necessary to secure a larger memory area.

At step 505, the distance information (e.g., a value invalid as a value indicating a distance) indicating that no moving object exists within the detection area 620 is saved in the internal memory. It is only necessary to be able to grasp the nonexistence of a moving object, and any information (e.g., flag) whose format is different from that of the normal distance value may be accepted.

At step 506, whether a user expected to have the intention of using the MFP 10 exists within the detection area 620 is determined. Specifically, the distance information corresponding to the past predetermined period of time (here, corresponding to the most recent 20 frames) dated back from the present point in time is read from the internal memory, and the time-series change in the moving object (human body) is analyzed based on the read distance information, and whether or not the moving object within the detection area 620 is a user having the intention of using the MFP 10 is determined. For this analysis, it may be possible to use the publicly known method, for example, such as simple pattern matching, DP matching, and machine learning, such as a hidden Markov model and a neural network. By analyzing the change in distance information from the past dated back by a predetermined number of frames until the present time, it is possible to determine approaching or leaving of a user.

At step 507, processing is branched in accordance with the results of the determination at step 506. First, in the case where the results of the determination indicate that a user expected to have the intention of using the MFP 10 exists within the detection area 620, the interrupt signal C described previously is output to the power source control unit 211. The power source control unit 211 cancels the sleep mode in response to the interrupt signal C and shifts the MFP 10 into the standby mode. Due to this, the MFP 10 enters the state where a user can make use of the MFP 10. On the other hand, in the case where the results of the determination indicate that a user expected to have the intention of using the MFP 10 does not exist within the detection area 620, the present processing is exited.

The above is the contents of the user detection processing in the sleep mode. In the present embodiment, explanation is given with the scene in mind where the standby mode is resumed from the sleep mode, but the scene to which the present invention can be applied is not limited to this. For example, it may also be possible to design a configuration in which, for example, the same processing is performed in the standby mode and in the case where it is determined that a user has left the detection area, the power source control unit 211 is notified of this and the power source control unit 211 having received the notification changes the power mode into the sleep mode.

<Background Data Acquisition Processing>

Figure 8:
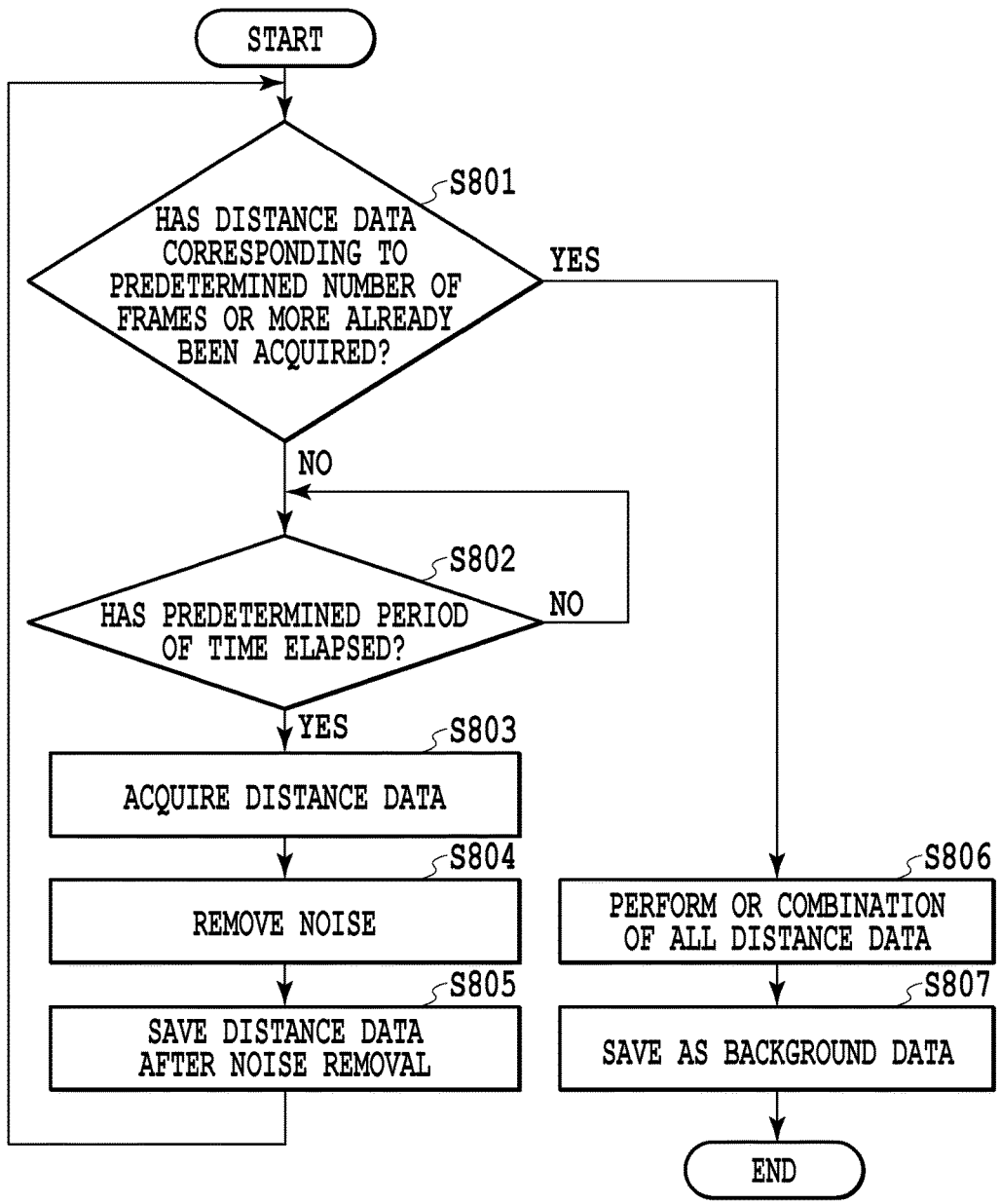
FIG. 8 is a flowchart of background data acquisition processing.

Following the above, acquisition of background data that is referred to in the determination processing at step 503 described previously is explained. FIG. 8 is a flowchart of background data acquisition processing. This background data acquisition processing is performed by the microcontroller 514 at timing at which, for example, the power source of the MFP 10 is turned on or the human sensor function is changed from off to on. Because it is necessary to prepare the background data prior to the execution of the user detection processing described previously, control is performed so that the background data acquisition processing is performed at the timing as described above. It is possible to avoid the background data acquisition processing from being repeated each time the power source is turned on or the like by saving the acquired background data in a non-volatile memory, such as the ROM and the HDD.

At step 801, whether or not the distance data corresponding to a predetermined number of frames or more necessary to generate the background data has already been acquired is determined. As the predetermined number of frames, for example, one of 5 to 10 is set. The larger the predetermined number of frames, the more highly accurate background data is obtained, but the time taken for the processing is necessary and the amount of memory that is consumed increases, and therefore, it is recommended to determine the predetermined number of frames by taking a trade-off into consideration. In the case where the distance data corresponding to the predetermined number of frames or more has already been acquired, the processing advances to step 806. On the other hand, in the case where the already acquired distance data corresponds to a number less than the predetermined number of frames, the processing advances to step 802. At step 802, whether the acquisition timing of distance data has reached is determined. Acquisition of distance data is set so as to be performed at predetermined time (e.g., 100 msec) intervals and in the case where the timer (not shown schematically) within the microcontroller 514 checks that the acquisition timing has reached, the processing advances to step 803.

At step 803, as at step 501 in the flow in FIG. 5 described previously, instructions to radiate ultrasonic waves and to measure the reflected waves thereof are given to the human sensor unit 600 and the output signal (digital signal) of the amplifier/comparator 612, which is the measurement results, is acquired as distance data. At step 804 that follows, as at step 502 in the flow in FIG. 5 described previously, noise is removed from the acquired distance data. Then, at step 805, the distance data from which noise has been removed is saved in the internal memory, and the processing returns to step 801. As in the flow in FIG. 5 described previously, in the case where the possibility that noise is included in the output signal of the human sensor unit 600 is slight, the execution of noise removal may be omitted. Further, it may also be possible to design a configuration in which while the noise removal processing is performed in the user detection processing described previously, in the background data acquisition processing, the noise removal processing is not performed. Due to this, it is possible to expect the effect to reduce erroneous detection of a moving object.

Figure 9:
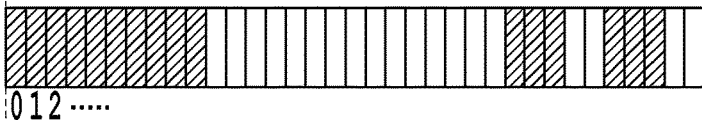
FIG. 9 is a diagram showing an example of background data generated by OR combination.

At step 806, background data is generated by using all the distance data corresponding to the predetermined number of frames. Specifically, from the internal memory, all the distance data is read and OR combination (logical sum) is performed for all the read distance data for each element. In addition to this, it may also be possible to generate background data by finding the number of times it is determined that "there is an object" for each element of all the distance data and by finally taking only the elements whose percentage of being determined that "there is an object" is higher than or equal to a fixed one to be elements of "there is an object". FIG. 9 is a diagram showing an example of background data generated by OR combination of a plurality of pieces of distance data. The background data thus generated is saved in the internal memory or the like of the microcontroller 514 at step 807 and the present processing is terminated. The above is the contents of the background data acquisition processing.

<Modification Example>

In the embodiment described above, the case is illustrated where the timing of performing acquisition of background data is the timing at which the power source of the MFP 10 is turned on or the timing at which the human sensor function is changed from off into on. However, the timing of performing background data acquisition processing is not limited to this. Here, an aspect is explained as a modification example in which the power mode of the MFP 10 is the sleep mode and acquisition processing of background data is performed at timing at which a state where a user is detected continues for a predetermined period of time. This supposes such a case where a user having used the MFP 10 places baggage, for example, such as a corrugated cardboard box, in front of the MFP and leaves. By performing background data acquisition processing at the timing according to the present modification example, a stationary object that continues to exist within the detection area 620 is reflected in background data and it is possible to prevent the stationary object from being erroneously detected as a human body.

Figure 10:
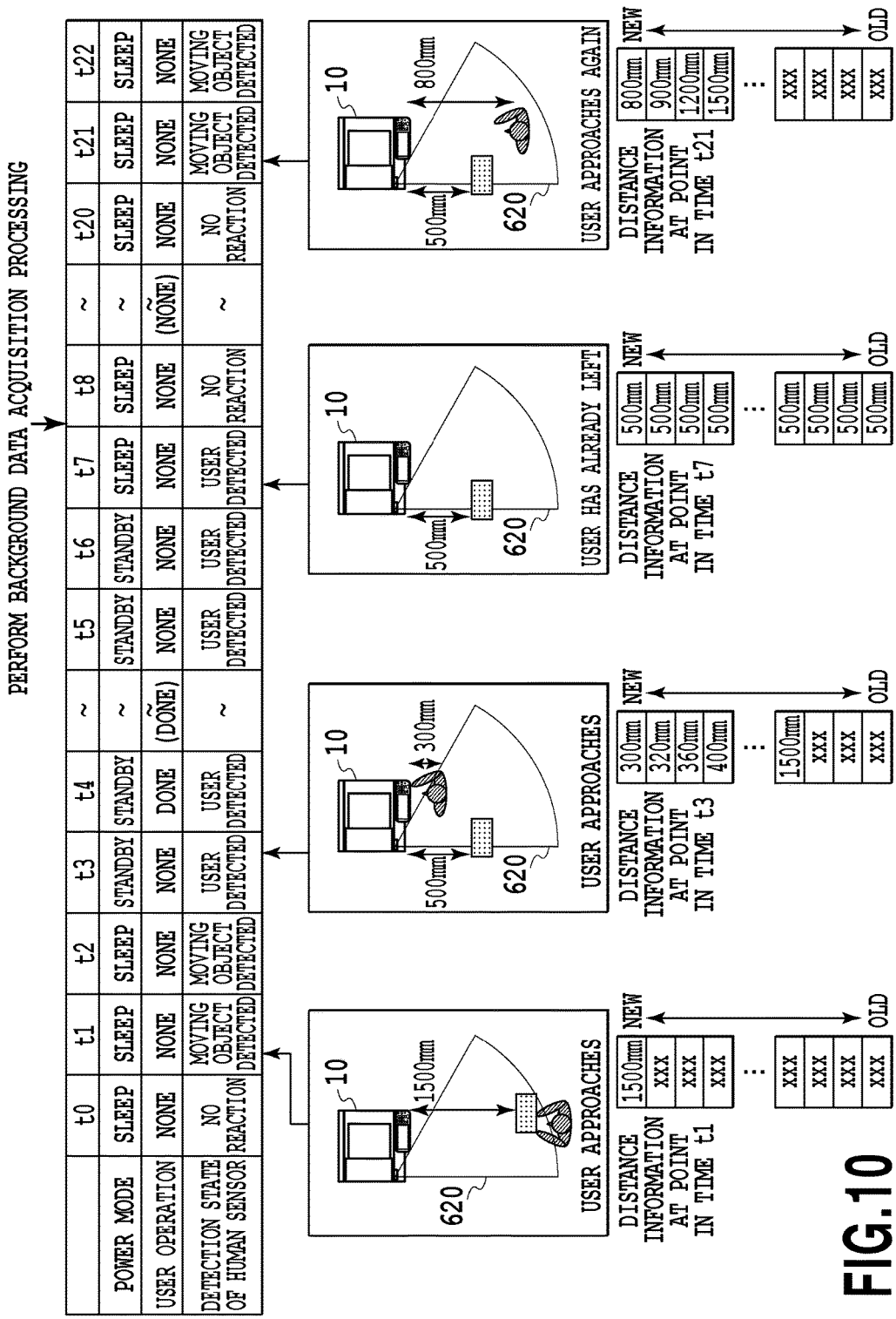
FIG. 10 is a diagram showing a detection state of the human sensor unit and a state of a power mode of the MFP in time series according to a modification example.

FIG. 10 is a diagram showing a change in detection state of the human sensor unit 600 and a change in power mode of the MFP 10 in time series by supposing a scene according to the present modification example. At each of points in time t0 to t22, the microcontroller 514 performs the user detection processing described previously and determines whether a moving object exists within the detection area 620 (step 503), and in the case where a moving object exists, determines whether the moving object is a user expected to have the intention of using the MFP 10 (step 506). In the following, detailed explanation is given in accordance with FIG. 10.

First, at the point in time t1, the microcontroller 514 compares the background data and the distance data at that point in time and detects a moving object (here, baggage carried by a user) having entered the detection area 620. Then, 1,500 mm is saved as information on the distance to the moving object. However, at this point in time t1, the detected moving object is not determined to be a user who will use the MFP 10.

Next, at the point in time t3, the microcontroller 514 compares the background data and the distance data at that point in time and detects a moving object and further, analyzes the distance information corresponding to the past twenty frames and determines that the detected moving object is a user who will use the MFP 10. In this scene, the user places the baggage at the position 500 mm in front of the MFP 10 prior to the operation of the MFP 10.

Then, at the point in time t5, the user completes the operation of the MFP 10 and in the case where the state where the MFP 10 is not used continues for a predetermined period of time (e.g., 120 sec), the CPU 221 within the main controller 200 detects this fact at the point in time t7 and shifts the power mode from the standby mode into the sleep mode. However, at this point in time t7, the microcontroller 514 still remains in the state of detecting the baggage the user left. That is, despite that the user has left the detection area 620, the erroneously detected state where the user is determined to exist continues. Then, in the case where the microcontroller 514 detects the continuation of the user detected state for a predetermined period of time (e.g., 60 sec) with the power mode being the sleep mode, the background data acquisition processing is performed (the thick arrow in FIG. 10). Due to this, the background data is generated in the state where the stationary object is placed at the position 500 mm in front of the MFP 10. As a result of this, at the point in time t21 after the point in time t8, in the case where the user approaches the MFP 10 again, it is possible for the microcontroller 514 to determine whether or not a moving object exists without being affected by the stationary object placed at the position 500 mm in front of the MFP 10. By performing reacquisition of background data at the timing of continuation of the state where the user is detected for a predetermined period of time in the sleep mode as described above, even in the case where the baggage or the like is left in front of the MFP 10, it is possible to prevent the baggage or the like from being erroneously detected as a user.

As the timing of execution of background data acquisition processing, the following timing is further considered.

1) A point in time at which it is determined that the distance data obtained from the human sensor unit 600 does not change for a predetermined period of time 2) A point in time at which the MFP 10 shifts from the standby mode into the sleep mode 3) A point in time at which a user or an administrator, such as a service person, gives instructions As an example of the above-described 3), for example, there are cases as follows.

A case where instructions to perform background data acquisition processing are given via the operation unit 500, the external PC, and so on A case where a date and time specified/registered in advance as timing of execution of background data acquisition processing has reached As described above, according to the present embodiment, it is possible to accurately detect a user who approaches or leaves an electronic apparatus, such as a printer, by preventing erroneous detection due to a stationary object in human body detection using a range sensor.

[Second Embodiment]

In order to accurately detect a moving object, such as a human body, it is important to generate and acquire background data in the state where no person exists within the detection area of the human sensor unit 600. Regarding this point, it is difficult to guarantee at all times that no person exists within the detection area at the time of performing background data acquisition processing. For example, in the case where an administrator, such as a service person, gives instructions to perform background data acquisition processing from a PC or the like located distant from the MFP 10, there may be an situation in which it is not possible to check that no person exists in front of the MFP 10. Further, in the case where the date and time at which background data acquisition processing is to be performed is specified in advance, it is difficult to grasp in advance whether a person exists within the detection area at the point in time of execution.

Consequently, an aspect is explained as a second embodiment in which background data is updated during user detection processing. Explanation of the contents in common to those of the first embodiment is omitted or simplified and in the following, a different point is explained mainly.

Figures 11A, 11B:
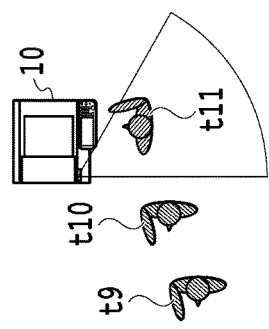
FIG. 11A and FIG. 11B are diagrams explaining updating of background data.

FIGS. 11A and 11B are diagrams explaining updating of background data. Here, a scene is supposed in which a user happens to be in front of the MFP 10 at the time at which background data acquisition processing is performed. In FIG. 11A, the left side shows a time-series change in background data and the right side shows a time-series change in distance data, respectively, and as in FIG. 6A described previously, each element of the shaded portion indicates "there is an object" and each element of the non-shaded portion indicates "there is no object". To the background data according to the present embodiment, in addition to information indicating "there is an object"/"there is no object", in the case where each element indicates "there is an object", a predetermined variable N (N>1) is given. In the example in FIG. 11A, the value of the variable N is set to 10, but this is not limited. In the following, explanation is given in accordance with FIGS. 11A and 11B.

First, at a point in time t11, a user exists in front of the MFP 10 (see FIG. 11B). Consequently, in the distance data at the point in time t11, four elements indicating "there is an object" due to the reflected wave from a person exist. Further, in the background data at the point in time t11 also, four elements indicating "there is an object" due to the reflected wave from the person exist. Each shaded element at the point in time t11 holds "10" as the value of the above-described variable N.

Next, at a point in time t10, the user is distant from the front of the MFP 10 and exists outside the detection area 620 (see FIG. 11B). Consequently, in the distance data at the point in time t10, the element indicating "there is an object" due to the reflected wave from the person does not exist. At this timing, the microcomputer 514 performs background data updating processing. Specifically, each element of the background data at the point in time t11 and each element of the distance data at the point in time t10 are compared and in the case where the element indicating "there is an object" within the background data at the point in time t11 indicates "there is no object" within the distance data at the point in time t10, the variable N in the element is decremented (1 is subtracted). As a result of this, the value of the variable N within the four elements indicating "there is an object" in the background data at the point in time t10 changes from "10" to "9".

Then, at a point in time t9, the user is at a position more distant from the MFP 10 (see FIG. 11B). Consequently, in the distance data at the point in time t9, the element indicating "there is an object" due to the reflected wave from the person does not exist. As a result of the microcontroller 514 performing background data updating processing at this timing also, the value of the variable N within the four elements indicating "there is an object" in the background data at the point in time t9 changes from "9" to "8". After this, the same processing is repeated and at the time at which the value of the variable N becomes "0", the shaded element indicating "there is an object" is changed into a non-shaded element indicating "there is no object". In this manner, at a point in time t1, it is possible to obtain background data reflecting that the person has left the MFP 10.

As a summary of the above, updating of background data is performed by a procedure as follows. First, each element of background data at the present point in time and each element of the distance data in the immediately previous frame obtained by the most recent measurement are compared. Then, in the case where the element within the background data holds information indicating "there is an object", on a condition that the element within the distance data corresponding to the element holds information indicating "there is no object", the value of the variable N in the element within the background data is decremented. Then, in the case where the value of the variable N becomes 0, the element within the background data is changed into an element holding information indicating "there is no object". By the updating processing as described above, even in the case where the background data acquisition processing is performed in the state where a person exists within the detection area 620, on a condition that the person leaves the detection area 620, it is possible to reflect the state in the background data.

Figure 12:
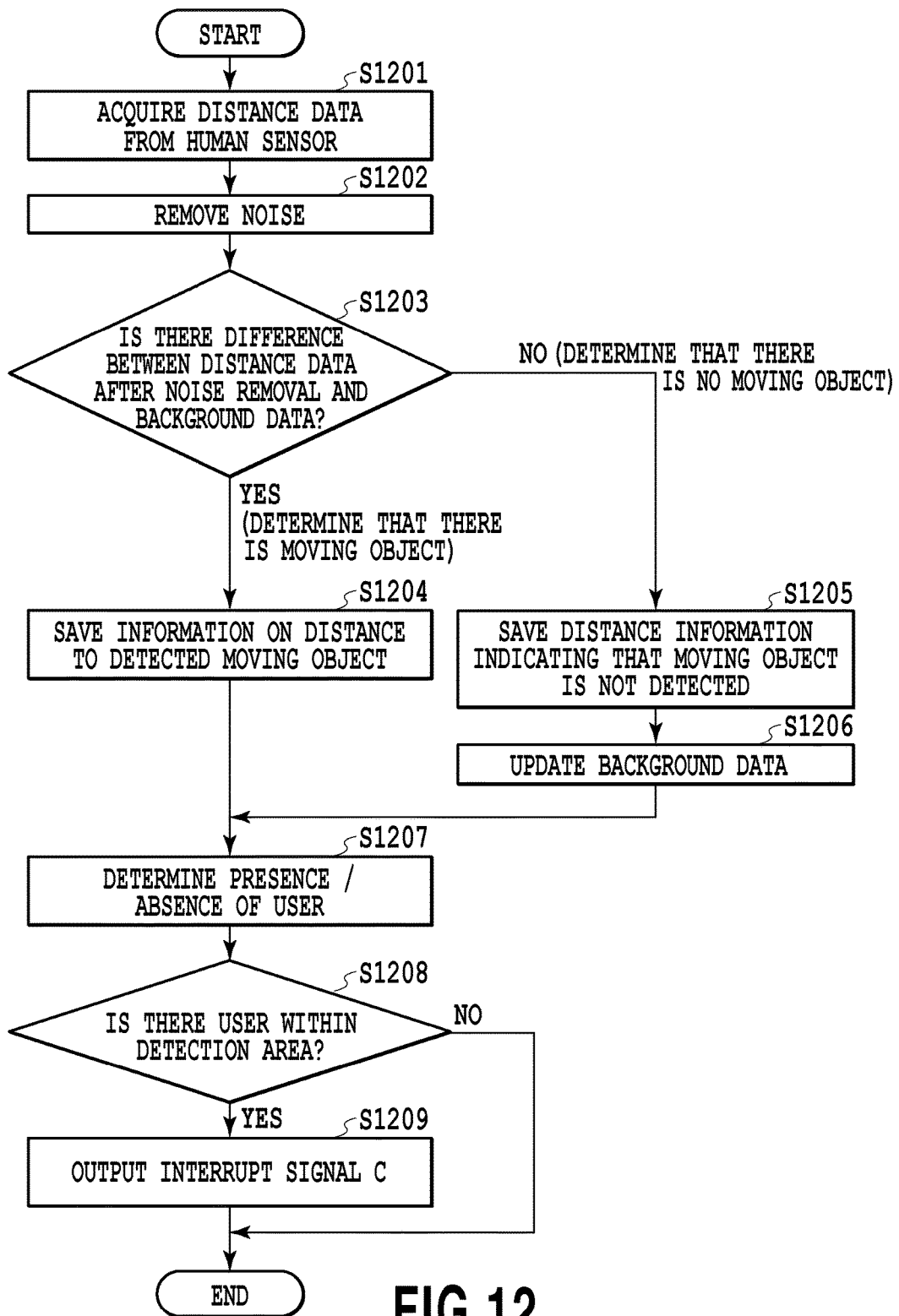
FIG. 12 is a flowchart showing a flow of user detection processing including background data updating processing according to a second embodiment.

FIG. 12 is a flowchart showing a flow of user detection processing including background data updating processing according to the present embodiment. Step 1201 to step 1205 correspond to step 501 to step 505 in the flow in FIG. 5 of the first embodiment. That is, noise is removed from the acquired distance data (S1201 and S1202) and the distance data after noise removal and the background data prepared in advance are compared and distance information in accordance with a difference between both pieces of data is saved (S1203 to S1205).

In the present embodiment, in the state where a moving object does not exist within the detection area 620 (No at S1203) and after the distance information indicating this fact is saved (S1205), at step S1206, the above-described updating processing of background data is performed. The subsequent step 1207 to step 1209 correspond to step 506 to step 508 in the flow in FIG. 5 of the first embodiment and there is no difference in particular, and therefore, explanation is omitted.

In the flow in FIG. 12, each time distance data is acquired (in each frame), background data updating processing is performed, but there may be a frame for which updating of background data is not performed, for example, in the case where background data updating processing is performed for every two frames.

According to the present embodiment, even in the case where background data is generated and acquired in the state where a person exists within the detection area, by frequently performing updating of background data, on a condition that the person leaves the detection area, it is possible to reflect the state in the background data. Due to this, in the case where a person appears again within the detection area, a difference between distance data and background data becomes easier to arise, and therefore, it is made possible to detect a user with high accuracy.

It may also be possible to implement the processing performed by the microcontroller 514 shown in each embodiment described above by a GPU (Graphics Processing Unit), an ASIC (Application Specific Integrated Circuit), an FPGA (Field-Programmable Gate Array), and so on. Further, part of processing to be performed may be implemented by hardware.

Furthermore, in each embodiment described above, explanation is given by using a multi function printer as an example of an electronic apparatus to which the present invention can be applied, but the electronic apparatus to which the present invention can be applied is not limited to this. For example, the electronic apparatus may be a personal computer, a home electrical appliance, and so on, which performs object detection by using a range sensor, such as an ultrasonic sensor.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to accurately detect a person who approaches (or a person who leaves) an electronic apparatus, such as a printer, by preventing erroneous detection due to a stationary object in human body detection using a range sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2016-150367 filed Jul. 29, 2016, which is hereby incorporated by reference wherein in its entirety.

What is claimed is:

1. An information processing apparatus being able to shift into a first power state and a second power state in which power consumption is lower than power consumption in the first power state, the information processing apparatus comprising:
a sonic sensor that outputs a sonic wave and receives a sonic wave, and outputs a value corresponding to the received sonic wave;
a storage unit;
a controller that stores, in the storage unit, a reference data including a plurality of values output from the sonic sensor during a predetermined period in a case where the information processing apparatus shifts into the second power state, and shifts a power state of the information processing apparatus into the first power state from the second power state based on at least a comparison and difference between the reference data stored in the storage unit and a frame data including the plurality of values output from the sonic sensor during the predetermined period,
wherein the reference data comprises background data indicating objects or people previously located in front of the information processing apparatus.

2. The information processing apparatus according to claim 1, wherein the controller updates the reference data stored in the storage unit.

3. The information processing apparatus according to claim 1, wherein the controller updates the reference data stored in the storage unit at regular intervals.

4. The information processing apparatus according to claim 1, wherein the controller updates the reference data stored in the storage unit based on at least the frame data including the plurality of values output from the sonic sensor.

5. The information processing apparatus according to claim 1, wherein the controller receives a plurality of frame data including the plurality of values output from the sonic sensor during the predetermined period and generates the reference data based on the plurality of frame data.

6. The information processing apparatus according to claim 1, further comprising a noise removal unit that removes noise included in the frame data including the plurality of values output from the sonic sensor.

7. The information processing apparatus according to claim 6, wherein the controller generates the reference data based on the frame data in which the noise is removed.

8. The information processing apparatus according to claim 1, wherein the controller receives a plurality of frame data including the plurality of values output from the sonic sensor during the predetermined period, and shifts the power state of the information processing apparatus into the first power state from the second power state based on at least the comparison and difference between the reference data stored in the storage unit and the plurality of frame data.

9. The information processing apparatus according to claim 1, wherein the sonic sensor is an ultrasonic sensor using ultrasonic waves.

10. An information processing method for an information processing apparatus being able to shift into a first power state and a second power state in which power consumption is lower than power consumption in the first power state, the information processing method comprising:
outputting, by a sonic sensor that outputs a sonic wave and receives a sonic wave, a value corresponding to the received sonic wave; and
controlling, by a controller, to store, in a storage unit, a reference data including a plurality of values output from the sonic sensor during a predetermined period in a case where the information processing apparatus shifts into the second power state, and shifting a power state of the information processing apparatus into the first power state from the second power state based on at least a comparison and difference between the reference data stored in the storage unit and the frame data including the plurality of values output from the sonic sensor during the predetermined period,
wherein the reference data comprises background data indicating objects or people previously located in front of the information processing apparatus.

11. An information processing apparatus being able to shift into a first power state and a second power state in which power consumption is lower than power consumption in the first power state, the information processing apparatus comprising:
a sonic sensor that outputs a sonic wave and receives a sonic wave, and outputs a value corresponding to the received sonic wave;
a storage unit; and
a controller that stores, in the storage unit, a reference data including a plurality of values output from the sonic sensor during a predetermined period in a case where a predetermined instruction is received from a user or a manager, and shifts a power state of the information processing apparatus into the first power state from the second power state based on at least a comparison and difference between the reference data stored in the storage unit and the frame data including the plurality of values output from the sonic sensor during the predetermined period,
wherein the reference data comprises background data indicating objects or people previously located in front of the information processing apparatus.

12. The information processing apparatus according to claim 11, wherein the predetermined instruction is an instruction to turn on a power of the information processing apparatus.

13. The information processing apparatus according to claim 11, wherein the predetermined instruction is an instruction to enable a function of the sonic sensor.

14. The information processing apparatus according to claim 11, wherein the controller updates the reference data stored in the storage unit.

15. The information processing apparatus according to claim 11, wherein the controller updates the reference data stored in the storage unit at regular intervals.

16. The information processing apparatus according to claim 11, wherein the controller updates the reference data stored in the storage unit based on at least the frame data including the plurality of values output from the sonic sensor.

17. The information processing apparatus according to claim 11, wherein the controller receives a plurality of frame data including the plurality of values output from the sonic sensor during the predetermined period and generates the reference data based on the plurality of frame data.

18. The information processing apparatus according to claim 11, further comprising a noise removal unit that removes noise included in the frame data including the plurality of values output from the sonic sensor.

19. The information processing apparatus according to claim 18, wherein the controller generates the reference data based on the frame data in which the noise is removed.

20. The information processing apparatus according to claim 11, wherein the controller receives a plurality of frame data including the plurality of values output from the sonic sensor during the predetermined period, and shifts the power state of the information processing apparatus into the first power state from the second power state based on at least comparison and difference between the reference data stored in the storage unit and the plurality of frame data.

21. The information processing apparatus according to claim 11, wherein the sonic sensor is an ultrasonic sensor using ultrasonic waves.

22. An information processing method for an information processing apparatus being able to shift into a first power state and a second power state in which power consumption is lower than power consumption in the first power state, the information processing method comprising:
- outputting, by a sonic sensor that outputs a sonic wave and receives a sonic wave, a value corresponding to the received sonic wave; and
- controlling, by a controller, to store, in the storage unit, a reference data including a plurality of values output from the sonic sensor during a predetermined period in a case where a predetermined instruction is received from a user or a manager, and shifting a power state of the information processing apparatus into the first power state from the second power state based on at least a comparison and difference between the reference data stored in the storage unit and the frame data including the plurality of values output from the sonic sensor during the predetermined period,
- wherein the reference data comprises background data indicating objects or people previously located in front of the information processing apparatus.

* * * * *